Sept. 11, 1928.  G. EGLOFF ET AL  1,683,766

APPARATUS FOR CRACKING OIL

Original Filed March 23, 1921

Inventors,
Gustav Egloff.
William R. Howard.

Patented Sept. 11, 1928.

1,683,766

UNITED STATES PATENT OFFICE.

GUSTAV EGLOFF, OF CHICAGO, ILLINOIS, AND WILLIAM R. HOWARD, OF WASHINGTON, DISTRICT OF COLUMBIA, ASSIGNORS TO UNIVERSAL OIL PRODUCTS COMPANY, OF CHICAGO, ILLINOIS, A CORPORATION OF SOUTH DAKOTA.

APPARATUS FOR CRACKING OIL.

Application filed March 23, 1921, Serial No. 454,880. Renewed July 3, 1926.

This invention relates to improvements in an apparatus for cracking oil and refers more particularly to the tube type of still in which the oil is heated by passing it through a series of tubes and thence to an expansion chamber. There is a frequent tendency for the oil to vaporize in the tubes, causing precipitation of the carbon and clogging up of the tubes.

The object of the present invention is to provide effective means for agitating the oil as it passes through the tubes so as to prevent the carbon from settling and to force it out of the tubes. In apparatus of this kind, that part of the oil which is directly in contact with the walls of the tubes is naturally more effectively heated than the center of the oil stream. In this invention, the oil is so agitated as it passes through the tubes as to tend to cause all particles of the oil to come into physical contact with the hot walls of the tube. The above is accomplished by means of helically arranged agitator members mounted entirely within the tubes and adapted to be rotated merely by the pressure of the oil passing through the tubes.

It is understood that the invention is not necessarily limited to any given size of tube and in fact, the agitator members may be used in any part of the apparatus where the oil is compelled to pass through tubular or shell-like members, whether vertically or horizontally disposed. The invention will be clearly illustrated, however, by showing the application of the agitator members to the heating tubes of a cracking coil.

Figure 1:
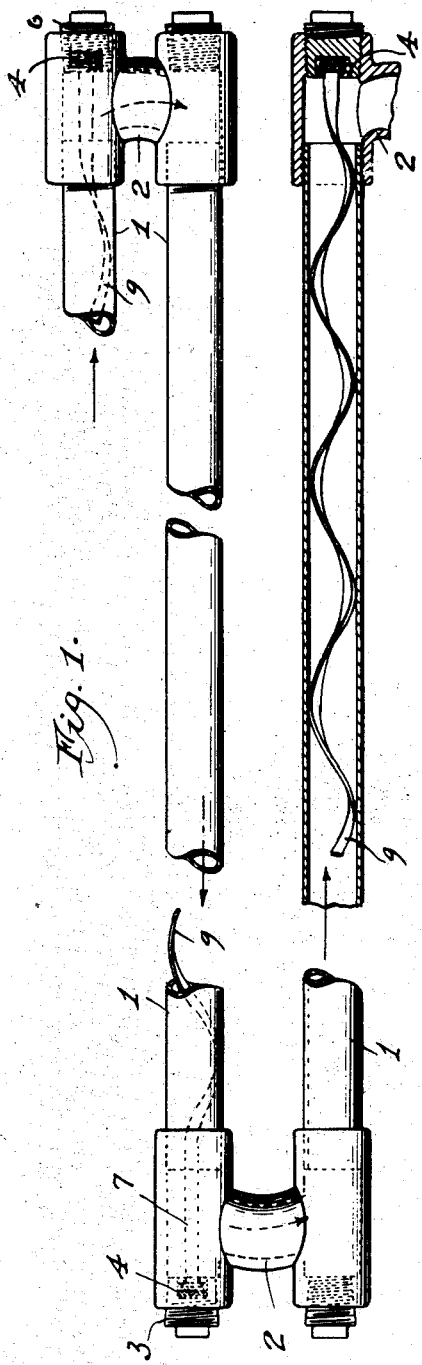
Fig. 1 is a fragmentary view, partly in side elevation and partly in vertical section, of our improved apparatus.
Figure 2:
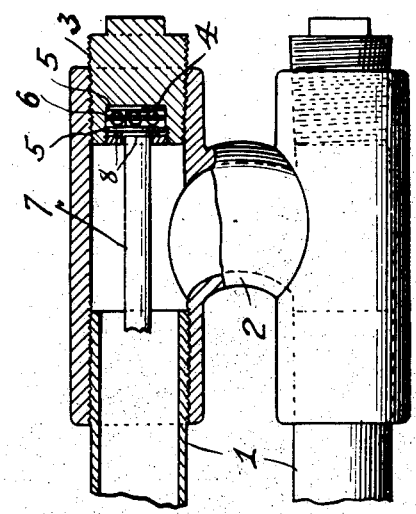
Fig. 2 is a detail view, on an enlarged scale, showing the manner in which one end of the revolving agitator blade is rotatably mounted.

Referring in detail to the drawings, 1 designates the tubes, the ends of which are connected by the return bends 2. In one end of each return bend is suitably secured a screw plug 3, carrying a thrust bearing 4. Each thrust bearing comprises the outer plates 5, and the intermediate plates 6 carrying the ball bearings. In the thrust bearing is secured the straight end 7 of the agitator blade, the end which is adjacent the thrust bearing being preferably provided with a collar 8 so that it cannot be dislodged from the thrust bearing. The blade may extend throughout all or part of the length of the tube and its main body portion is of helical form as shown at 9, the arrangement being such that it closely approaches the periphery of the tube while being free to rotate. Each thrust bearing is secured to that end of the tube which the oil approaches in its passage through the coil so as to force the end of the agitator blade against the thrust bearing and cause it to rotate.

We claim as our invention:

1. In an apparatus for cracking oil, the combination with a tubular heating conduit through which oil is adapted to be passed to be heated, a thrust bearing adjacent the discharge end of the conduit and a helical agitator member in said tubular conduit and having one end engaging said thrust bearing whereby the passage of oil through the conduit rotates the agitator member, the end thrust thereof being taken up by said thrust bearing, permitting a free rotation of said agitator.

2. In an apparatus for cracking oil, the combination with a tubular conduit, through which the oil is adapted to be passed and wherein it is subjected to heat, of a thrust bearing adjacent the discharge end of the conduit, and an agitator member extending longitudinally of said conduit, having one end thereof engaging said thrust bearing and so constructed that oil, passing through the conduit, will cause a rotary movement of said agitator member and prevent deposition of carbon in said conduit.

GUSTAV EGLOFF.
WILLIAM R. HOWARD.